(12) United States Patent
Fisher

(10) Patent No.: US 8,394,471 B2
(45) Date of Patent: Mar. 12, 2013

(54) ELECTRICALLY-CONDUCTIVE HOSE

(75) Inventor: William C. Fisher, Cuyahoga Falls, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 1958 days.

(21) Appl. No.: 11/173,559

(22) Filed: Jul. 1, 2005

(65) Prior Publication Data

US 2006/0127620 A1   Jun. 15, 2006

Related U.S. Application Data

(60) Provisional application No. 60/636,045, filed on Dec. 14, 2004.

(51) Int. Cl.
*H01L 21/00* (2006.01)

(52) U.S. Cl. .................. 428/35.7; 428/36.9; 428/36.91

(58) Field of Classification Search .............. 525/92; 252/511; 106/476; 428/221, 36.91; 392/472; 285/7, 47; 138/122
See application file for complete search history.

(56) References Cited

U.S. PATENT DOCUMENTS

| | | | |
|---|---|---|---|
| 5,213,891 A | 5/1993 | Maj et al. | |
| 5,643,526 A | 7/1997 | Hert et al. | |
| 5,662,975 A | 9/1997 | Hert et al. | |
| 5,733,480 A * | 3/1998 | Lee et al. | 252/511 |
| 5,910,540 A * | 6/1999 | Takahashi | 525/92 B |
| 5,916,945 A | 6/1999 | Bussi et al. | |
| 6,302,153 B1 | 10/2001 | Merziger | |
| 6,506,830 B1 * | 1/2003 | Bussi et al. | 524/495 |
| 6,807,988 B2 | 10/2004 | Powell et al. | |
| 6,919,394 B2 * | 7/2005 | Miyoshi et al. | 524/424 |
| 2002/0155242 A1 | 10/2002 | Bellet et al. | |
| 2003/0065107 A1 | 4/2003 | Lacroix et al. | |
| 2003/0124288 A1 | 7/2003 | Merziger et al. | |

OTHER PUBLICATIONS

Erachem Europe, Product Specification Ensaco 150 Powder, Revision 4 dated Jun. 9, 1999.
Erachem Europe, Product Specification Ensaco 150 Granular, Revision 6, dated May 17, 2002.
Erachem Comlog S.A., Tentative Product Specification Ensaco 260 Granular, Revision 3, dated May 17, 2002.
Parker-Hannifin Corporation Engineering Manual, Parflex Division, for Flexible Thermoplastic Hose for Conveying Compressed Natural Gas Style 3CNG/4CNG/5CNG, revised Sep. 20, 2000.
Parker-Hannifin Corporation, Parflex Division, CNG-Electrically Conductive Compressed Natural Gas Hose 3600 to 5000 PSI.
Atofina Chemicals, Inc. Technical Information, Pebax® 33 Series Property Comparison.
Aftona Chemicals, Inc., Pamphlet entitled Pebax® Application Areas.
Atofina Chemicals, Inc., Pamphlet entitled Rilsan® Conductive Polyamides.
Atofina Chemicals, Inc., Pamphlet entitled Rilsen® Polyamide, M-AESN Noir P212 CTL Performance Data.
Atochem, Inc., Pamphlet entitled Pebax® Polyether Block Amide, Revised 1988.

* cited by examiner

*Primary Examiner* — Ellen S Wood
(74) *Attorney, Agent, or Firm* — John A. Molnar, Jr.

(57) ABSTRACT

Tubular polymeric composite for articles such as tubing and hoses. The composite is formed of a tubular first layer of a thermoplastic block polyether amide resin (PEBA) filled with a more structured carbon black particulate filler to render it electrically-conductive, and a tubular second layer of a thermoplastic polyamide, polyester, polyolefins, or other thermoplastic resin compatible with the PEBA resin of the first material, and which second material optionally may be filled with a less structured carbon black particulate filler to render it electrically-conductive.

27 Claims, 2 Drawing Sheets

ELECTRICALLY-CONDUCTIVE HOSE

CROSS-REFERENCE TO RELATED CASES

The present application claims the benefit of the filing date of U.S. Provisional Application Ser. No. 60/636,045; filed Dec. 14, 2004, the disclosure of which is expressly incorporated herein by reference.

BACKGROUND OF THE INVENTION

The present invention relates broadly to multi-layer, electrically-conductive tubular polymeric composites and to articles such as hoses and tubing, which may be straight or coiled, constructed thereof, and more particularly to such composites used as core tubes in such articles as hose for use in the delivery of compressed natural gas (CNG) and other fuel, or in other applications requiring some degree of electrical conductivity for static dissipation or electrical grounding.

Thermoplastic tubing and hose is used in a variety of fluid transfer applications. In basic structure, tubing and hoses of the type herein involved typically are constructed as having a tubular, innermost core. In reinforced constructions, the core may be surrounded by one or more outer layers of a fiber reinforcement. The reinforcement, in turn, is protected by a surrounding outermost sheath or cover which may be of the same or different material as the core tube. The cover also provides the tubing or hose with increased abrasion resistance.

The core tube, which may be a thermoplastic material molded or, more typically, extruded from one or more layers of one or more of a polyamide, polyolefin, polyvinyl chloride, ethylene vinyl alcohol, polyurethane, fluoropolymer, and/or a synthetic rubber material such as Buna N or neoprene, may be conventionally extruded, or co-extruded as the case may be, and cooled or cured. In some multi-layer tubing constructions, such as used for fuel line applications, a bonding or tie layer may be incorporated between an inner layer or liner which may be chemically-resistant, and a second layer of a stronger, tougher, and, typically, less-expensive material, such as a nylon, polyamide, or polyurethane, which is used as a reinforcement or cover for the liner. The tie layer, which may be formed as a co- or tri-extrusion with the liner and second layers, is formulated to be compatible chemically with both the material of the liner and the material of the second layer such that a thermal fusion bond may be achieved between the liner and tie layer and the tie layer and second layer to thereby consolidate the tubing into an integral structure. The use of such tie layers dictates the selection of specific materials for the liner and second layer so as to be compatible with the material of the tie layer, or vice versa, and is believed limited to the use of melt processible fluoropolymers such as polyvinylidene fluoride (PVDF) or ethylene tetraflurorethylene (ETFE). Depending upon its material of construction, the tube may be cross-headed extruded on a mandrel for support, or otherwise supported in later forming operations using air pressure and/or reduced processing temperatures.

From the extruder, the tube may be collected on a reel or other take-up device for further processing. As dispensed from the reel or, in a continuous in-line process, taken directly from the extruder, the tube, which may be frozen or otherwise chilled, such as by being sprayed with a liquid and gaseous nitrogen mixture or the like to improve dimensional stability, next may be passed through an applicator for its coating with an outer layer of an adhesive material. The adhesive-coated core tube then may be delivered through one or more braiders or winders which may be used to surround the tube with one or more reinforcement layers of a fibrous material such as a monofilament, yarn, or wire. The reinforcement layers, which may be applied under tension and bonded to the core tube via the adhesive layer, typically may be formed of an interwoven braid or a spiral winding of a nylon, polyester, or aramid yarn, or a metal wire.

Following the application of the reinforcement layer, a second adhesive layer may be applied to bond the reinforcement to the outer cover or sheath. Such cover, which may be applied as a cross-head extrusion or a spiral-wound wrapping, typically is formed of abrasion-resistance polymeric material such as a polyamide, polyolefin, polyvinyl chloride, or polyurethane. Again, the adhesive layer bonds the outer cover to the reinforcement layer.

Tubing and hose for many applications must meet particular governmental or industry regulations and therefore are subject to certain performance requirements. For example, in the case of hoses used in the dispensing or other delivery or conveying of CNG or other fuels, such hoses typically must exhibit a certain degree of electrical conductivity for electrical grounding, static dissipation, or otherwise. In this regard, such hoses may employ a core tube formed of a nylon or other material which is rendered electrically conductive via its loading with carbon black or other electrically conductive particulate filler.

For certain applications, however, specifications call for the use of a small diameter, high pressure hose which is more conductive than those conventionally used, but which is still flexible and compatible with natural gas or other fuels. Such hose, moreover, should have a long service and be economical to produce.

In view of the foregoing, it will be appreciated that hose and tubing constructions for CNG and other fuel conveying applications must exhibit a demanding balance of chemical, physical, and electrical properties. Indeed, as commercial and even, such as in the case of filling CNG/gasoline hybrid vehicles, residential applications for such hoses continue to increase, it is believed that improvements in the construction thereof would be well-received by the industry.

BROAD STATEMENT OF THE INVENTION

The present invention is directed to multi-layer, electrically-conductive tubular polymeric composites and to articles such as hoses and tubing, which may be straight or coiled, constructed thereof, and more particularly to such composites which may be used as core tubes in such articles as hose for use in the delivery of compressed natural gas (CNG) and other fuel, or in other applications requiring electrical conductivity for static dissipation or electrical grounding. The hoses herein involved may be constructed for low, medium, and even high, i.e., working pressures of about 1500 psi (10 MPa) or more, pressure service, and are especially suited for use in applications specifying a low volumetric throughput. In this regard, the electrically-conductive tubular polymeric composites herein involved may be of a small diameter variety as having an inner diameter of 0.12 inch (3 mm) or less.

Particularly in the case of such small diameter tubing, it is believed to heretofore have been problematic to impart sufficient conductivity, typically measured as a surface resistance or resistivity, to such tubing using conventional techniques so as to render the tubing suitable for certain applications. In this regard, the gas or other fluid to be conveyed may limit the use of certain resin and fillers, particularly metal particles. Further, the use of thick tubing for the hose core, which tubing otherwise might have sufficient conductivity when filled with a conventional carbon black filler, may be precluded as such tubing generally is specified to have a wall thickness of not greater than about 0.028 inch (0.7 mm) so as to retain sufficient flexibility in the hose. The use of higher filler loading levels also can affect the strength and flexibility of the hose, as well as presenting problems in the extrusion of the tube. Means other than the use of a conductively-filled core tube, such as embedded metal wires, also can affect the flexibility and other performance of the hose, as well as complicating to the connection of the hose to terminal fittings in a manner which retains electrical continuity between the hose and the fittings.

The electrically-conductive tubular polymeric composite of the present invention is believed to address the foregoing problems for hoses incorporating nylon and other polyamide-based cores by employing a double or other multi-layer construction. In such construction, a layer of a carbon black-filled polyether block amide ("PEBA") resin providing high electrical conductivity and satisfactory chemical resistance is supported by a layer of a more conventional polyamide resin such a nylon, which may or may not be filled to render it electrically conductive, providing good strength and flexibility, as well as excellent chemical resistance and gas permeation resistance.

The PEBA resin layer of the composite of the present invention may be filled with a carbon black or "black" having a structured or highly structured morphology, i.e., as having particles formed of relatively long carbon chains and/or as having a relatively high degree of branching between particles. As compared to less structured blacks, structured, i.e., more structured carbon black may exhibit, for example, a relatively large surface area, which may be measured by a nitrogen adsorption, i.e., BET, method per ASTM Standard D3037-89, of at least about 500 $m^2/g$ and/or a relatively high pore volume, which may be measured by a DBP (di-butyl-phthalate) adsorption method per ASTM Standard D 2414-90, of greater than about 300 ml/100 g, i.e., ml of DBP per 100 g black. When loaded and admixed into a resin, a more structured black would be expected to effect a lower electrical resistance, typically measured by the surface resistivity, at a given loading level as compared to a less structured black, i.e., a black having a relatively smaller BET surface area of not greater than about 200 $m^2/g$, and/or a relatively lower DBP adsorption of not greater than about 250-300 ml/100 g. Of course, the use of a lower filler loading level, e.g., not greater than about 22% by weight, would be desirable as it is known that higher loading levels can complicate extrusion and other processing in increasing the melt flow viscosity of the resin-black admixture, and also can affect the physical properties, such as modulus, elongation, dimensional stability and impact strength, of the final tubing or hose product.

However, it is also known that the more structured blacks are difficult to disperse in polyamide melts as tending to produce agglomerations which can result in a material having anisotropic physical properties and otherwise as exhibiting poor physical properties such as impact resistance. In this regard, it has been proposed, as detailed in U.S. Pat. No. 6,506,830, to load polyamides with relatively high percentages of a less structured black as a means of effecting a lower resistivity.

Unexpectedly, it has been discovered that the PEBA resin layer of the composite the present invention can be loaded, such as to about 10% by weight, with a more structured black without the deleterious effects observed which such blacks are admixed with more conventional polyamide resins such as nylons. When co-extruded with or otherwise joined to a layer of a nylon or other polyamide, or a polyolefin, polyester, or other thermoplastic resin compatible with the PEBA resin, which other thermoplastic resin layer optionally may be filled with a less structured carbon black, the more structured carbon black-filled PEBA layer of the present invention may be employed to construct a small-diameter tubular polymeric composite which is sufficiently electrically-conductive to be used as a core tube in hoses for CNG and other fuel delivery applications, but which composite also is sufficiently strong and flexible such that the physical properties of the hose are not compromised in such applications. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
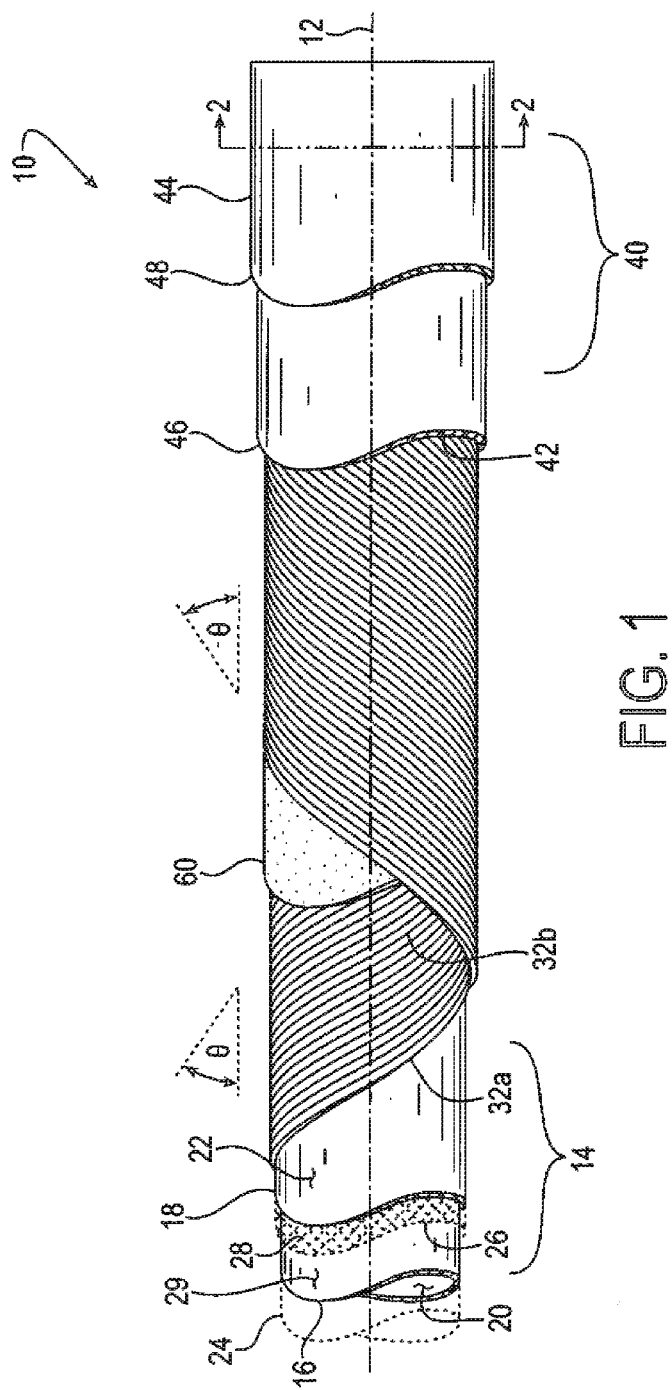
FIG. 1 is a side elevational, cut-away view of a representative embodiment of a hose construction incorporating a tubular polymeric composite constructed in accordance with the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" or "horizontal" and "axial" or "vertical" referring, respectively, to directions, axes, planes perpendicular and parallel to the central longitudinal axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the purposes of the discourse to follow, the precepts of the multi-layer, electrically-conductive tubular polymeric composites layer of the invention herein involved are described in connection with its utilization within a representative hose construction which may be rated for use over a range of low, medium, and high pressure, i.e., up to about 1500 psi (10 MPa) or higher, applications, and particularly to constructions for use in the delivery of compressed natural gas (CNG) and other fuel, or in other applications requiring some degree of electrical conductivity for static dissipation or electrical grounding.

Figure 2:
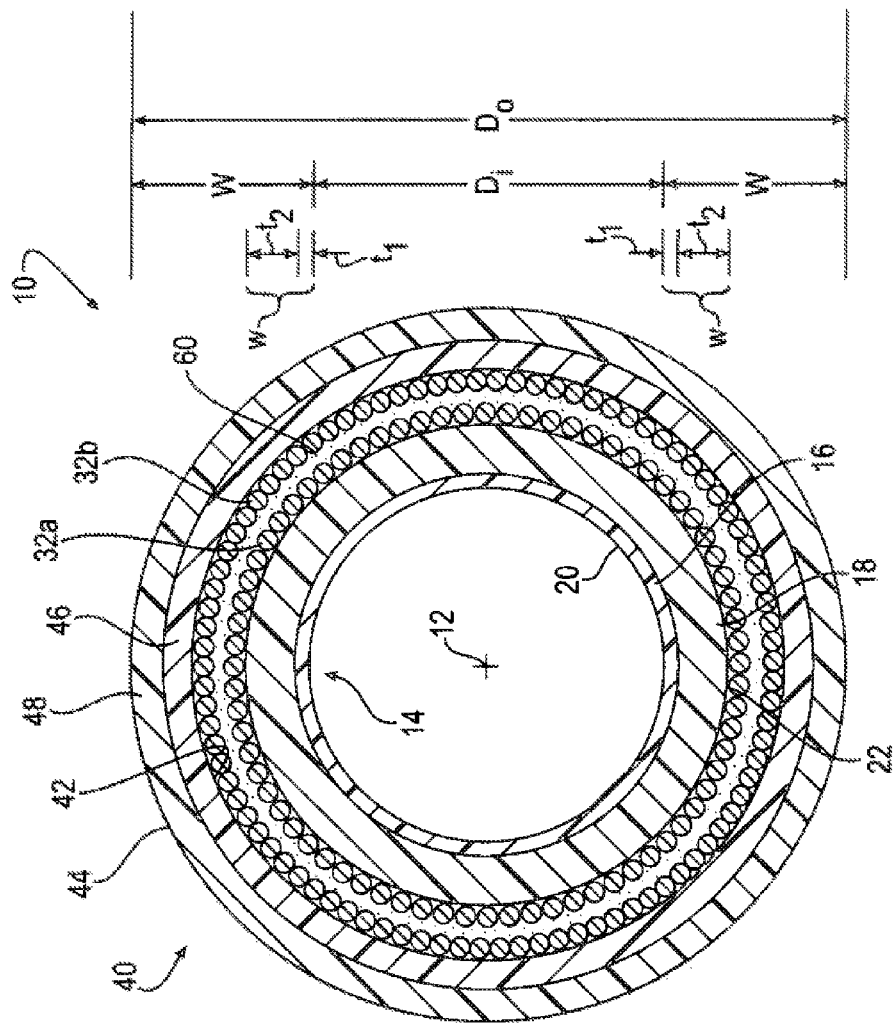
FIG. 2 is a radial cross-sectional view of the hose construction of FIG. 1 taken through line 2-2 of FIG. 1.

Referring then to the figures, wherein corresponding reference characters are used to designate corresponding elements throughout the several views with equivalent elements being referenced with prime or sequential alphanumeric designations, a representative hose construction according to the present invention is shown generally at 10 in the cut-away view of FIG. 1 and in the radial cross-sectional view of FIG. 2. In basic dimensions, hose 10 extends axially to an indefinite length along a central longitudinal axis, 12, and has a select inner and outer diameter referenced, respectively, at "$D_i$" and "$D_o$" in the radial cross-sectional view of FIG. 2. The inner and outer diameter dimensions may vary depending upon the particular fluid conveying application involved, but at least for CNG applications generally will be between about 0.030-0.190 inch (0.076-0.483 cm) for inner diameter $D_i$, and about 0.125-0.325 inch (0.318-0.826 cm) for outer diameter $D_o$, with a overall wall thickness, "W," therebetween of between about 0.048-0.068 inch (0.122-0.173 cm).

As may be seen in the different views of FIGS. 1 and 2, hose 10 is constructed as being formed about a tubular core, referenced at 14. In accordance with the precepts of the present invention, core tube 14 may be provided as co-extruded, molded, or otherwise formed as having a multi-layer, i.e., two or more layer, laminate construction. Such laminate construction may include at least a first layer, 16, which as shown may be an innermost layer, and a second layer, 18, which as shown may be an outermost layer, which may be concentric with and, in the hose 10, integrally adjoins the first layer 16. In the illustrated construction of hose 10, core tube 14 thereof has a circumferential inner surface, 20, defining the inner diameter, referenced at $D_i$ in FIG. 2, of the hose 10, and a circumferential outer surface, 22. As with the overall dimensions of hose 10, the overall wall thickness of core tube 14, referenced at "w" in FIG. 2, may vary for the particular application envisioned, but typically will be between about 0.016-0.036 inch (0.040-0.091 cm). Typically, the core tube 10 may be generally round in cross-section as shown, but alternatively may be of an elliptical, polygonal, or other geometric shape.

The wall thicknesses of each of the layers 16 and 18 forming the core tube 14 may be of any thickness, both absolute and relative to the thickness of the other layer, but for many applications, and as may be irrespective of which of the layers 16 and 18 forms the outer surface 22 and which forms the inner surface 20, the first layer 16 may be relatively thin as having a thickness, referenced at "$t_1$", of between about 0.004-0.018 inch (0.10-0.46 mm), with second layer 18 being relatively thick as having a thickness, referenced at "$t_2$", of between about 0.008-0.032 inch (0.20-0.81 mm). For cost and performance considerations, the wall thickness $t_2$ of the second layer 18 may comprises between about 70-80% of the overall thickness W of the layers 16 and 18, with the wall thickness $t_1$ comprising between about 20-30% of such thickness, i.e., the wall thickness $t_2$ being about 1.2-4.8 times thicker than the thickness $t_1$.

Although the core tube outer surface 22 is shown to be formed of the second layer 18, and the core tube inner surface 20 is shown to be formed of the first layer 16, the relative orientation of the layers may be reversed such that the outer surface 22 is formed of the first layer 16, and the inner surface 20 is formed of the second layer 18. Also, although the outer and inner surfaces 20 and 22 are shown to be, respectively, the innermost and outermost surfaces of the core tube 14, it will be appreciated that alternate constructions of the core tube 14 may envision that one or more additional layers, one of which is referenced in phantom at 24 in FIG. 1, may be provided to be surrounded by the first layer 16, and/or one or more other additional layers, one of which is referenced in phantom at 26, may be provided to surround the second layer 18. Similarly, in the reverse construction, one or more additional layers may be provided to surround the first layer 16, and/or one or more other additional layers may be provided to be surrounded by the second layer 18.

To the extent compatible with the materials of the layers 16 and 18, such additional layers may be co-extruded or otherwise formed therewith as bonded or otherwise directly joined thereto such as by way of a fusion bond. Alternatively, if incompatible for example, the additional layers may be bonded by means of a tie layer. The additional layers may be formed of thermoplastic materials, such as polyamides, polyesters, polyurethanes, flurorpolymers, polyolefins, polyvinyl chlorides, polyacetals, ethylene vinyl alcohols (EVA), and polyoxymethylenes (POM), of natural rubbers such as Hevea, of thermoplastic, i.e., melt-processible, or thermosetting, i.e., vulcanizable, synthetic rubbers such as fluoropolymer, chlorosulfonate, polybutadiene, butyl, neoprene, nitrile, polyisoprene, and buna-N rubbers, of copolymer rubbers such as ethylene-propylene (EPR), ethylene-propylene-diene monomer (EPDM), nitrile-butadiene (NBR) and styrene-butadiene (SBR), and/or of blends such as ethylene or propylene-EPDM, EPR, or NBR, and copolymers, and mixtures, such as alloys and blends, of any of the foregoing. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

In a representative construction including one or more additional layers, the layer 24 may be provided as innermost layer or liner. For chemical resistance, such layer 24 may be provided as extruded or otherwise formed of a melt-processible thermoplastic which may be a fluoropolymer, polyamide, polyolefin, or co-polyester. As used herein, "chemical resistance" should be understood to mean the ability to resist swelling, crazing, stress cracking, corrosion, or otherwise to withstand attack from mild acidic or alkaline solutions, phosphate-ester solutions, and alcohols and other organic solvents and hydrocarbons, as well as inorganic solvents such as water or brine. Preferred fluoropolymers include polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetraflurorethylene (ETFE) terpolymer, polyvinylidene fluoride (PVDF), polyvinylfluoride (PVF), and copolymers and blends thereof. For cost considerations, the wall thickness of the layer 24 may be maintained at the minimum necessary to provide the desired solvent, gas, or liquid permeation resistance, and for most applications may be between about 2-30 mils (0.05-0.76 mm).

The core tube layers 16 and 18 themselves may be fabricated by extrusion, co-extrusion, or sequential extrusion and, if formed of compatible materials in the manner to be described hereinafter, thereby cross-linked or otherwise chemically or fusion bonded together at their interface into an integral, tubular composite structure. In the case of the additional layers, such as the layers 24 and 26, if formed of chemically dissimilar or otherwise incompatible materials than the materials of the corresponding layers 16 and 18, an adhesion-promoting surface treatment may be applied to the surfaces 20 and/or 22. Alternatively, or an intermediate tie or bonding layer may be co-extruded between the layers 16 and 24, and/or the layers 18 and 26, or sequentially extruded or over-coated therebetween, as being formed of a material which is adhesion bond compatible with both the materials of layers 20 and 22. The wall thicknesses of the intermediate layers typically will be less than or about equal to the wall thickness of the other layers. The use of tie layers is further described in U.S. Pat. Nos. 3,561,493; 5,076,329; 5,167,259; 5,284,184; 5,383,087; 5,419,374; 5,460,771; 5,469,892; 5,500,257; 5,554,425; 5,566,720; 5,622,210; 5,678,611; 5,743,304; 6,390,141; 6,742,545; 6,807,988; 6,776,195; and in publication US 2004/0134555.

The first layer 16 of the core tube 14 is rendered electrically-conductive, such as for static dissipation and/or electrical grounding, as being formed of a first material which comprises an admixture of a structured, i.e., or more structured or less amorphous as compared to the black, if any, of the second layer 18, carbon black filler and a thermoplastic polyether block amide ("PEBA") resin, such material providing high conductivity and satisfactory chemical resistance. In turn, the second layer 18, which may back-up or otherwise support the first layer 16, may be formed of a second material different form the first material and which may comprise a more conventional thermoplastic resin which may be a polyamide such as a nylon, a polyolefin resin such as polyethylene, or a polyester, and which material may or may not be filled to also render it electrically-conductive, such material otherwise providing good strength and flexibility, as well as excellent chemical resistance. In the event that the polymer resin-based of the material of the second layer is so filled, it may be filled with a less structured black, i.e., as compared to the black used to fill the PEBA resin-based of the material in the first layer 16.

Each of the resins of the first and second materials may be a homo or copolymer, or a blend thereof, i.e., a blend of one or more homopolymers, one or more copolymers, or one or more homopolymers and one or more copolymers. Such resins each additionally may be admixed with other resins, which may be thermoplastic or thermosetting, such as to form an alloy, blend, or other mixture, or a copolymer thereof.

The basic structure of the thermoplastic PEBA resin of the first material of the first layer 16 consists primarily of regular and linear chains of rigid polyamide blocks which may be nylons, and flexible polyether blocks. Such structure may be represented by the generalized formula shown below, wherein "PA" represents the polyamide blocks and "PE" represents the polyether blocks:

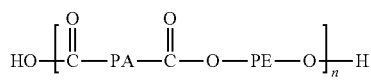

PEBA resins of the type herein involved are further described in U.S. Pat. No. 5,213,891, and are marketed commercially under the tradename "PEBAX®" by ATOFINA Chemicals, Inc., Philadelphia, Pa. For CNG hose applications, a PEBA resin having a hardness of between about 40 Shore D and 95 Shore A may be desirable. As used herein, the term "thermoplastic material," which may be used interchangeably with the term "melt processible material," should be understood to be in contrast to non-melt processible materials such as thermosets or non-thermosetting materials which otherwise exhibit a melt viscosity that is sufficiently high so as to preclude flow and processing by conventional melt extrusion or molding operations, and therefore necessitating that the material be processed using sintering or solvent processing techniques. Such thermoplastic materials or "resins," typically will have a melting point of between about 110-230° C., and a thermal decomposition temperature, which defines the upper processing limit of the resin, of between about 150-260° C. As also used herein, "melting point" may be a transition from a form-stable crystalline or glassy solid phase to a softened or otherwise viscous phase which may be generally characterized as exhibiting intermolecular chain rotation and, as between layers, chain diffusion and/or other intermingling. For amorphous or other thermoplastic resins not having a clearly defined melting peak, the term melting point is used interchangeably with glass transition or softening point.

Regarding the carbon black filler for the first material of the first layer, as compared to other carbon forms such as graphite and diamond, carbon blacks in general are classed as having an amorphous structure which lacks, for example, the layer planes associated with graphitic forms. However, within this context, the structured or "more structured" black filler of the first material general does exhibit a structured or highly structured morphology insofar as having particles formed of relatively long carbon chains and/or as having a relatively high degree of branching between particles. As compared to a less structured black, such structured, i.e., more structured, carbon black may exhibit, for example, a relatively large surface area, which may be measured by a nitrogen adsorption, i.e., BET, method per ASTM Standard D3037-89, of at least about 500 m$^2$/g, and/or a relatively high pore volume, which may be measured by a DBP (di-butyl-phthalate) adsorption method per ASTM Standard D 2414-90, of greater than about 300 ml/10 g, i.e., ml of DBP per 100 g black.

As admixed with the black, the PEBA resin component generally may form a binder within the first material into which the black filler may be dispersed. The black filler generally is included within the first material in a proportion sufficient to provide the level of electrical conductivity which is desired for the intended application. For most applications including CNG applications, a bulk or volume resistivity of not greater than about 25 Ω-cm, and/or a surface resistivity of not greater than about $10^4$ Ω/sq-cm, generally would be considered acceptable, and would translate to a filler loading which generally may be between about 6-25% by weight, based on the total weight of the first material.

In general, the filler may be of any shape, or combination of shapes, and is referred broadly herein as being "particulate," which should be understood to include spheres and microspheres, flakes, platelets, fibers, rods, irregularly-shaped particles, fibers, which may be chopped or milled or whiskers, granules, and powders. For many applications, the particle size or distribution of the filler, which may be a diameter, imputed diameter, length, or other dimension of the particulate typically will range from about 0.01 mil (0.25 μm) to about 10 mils (250 μm) for powders, and from about 0.004 inch (0.1 mm) to about 1 inch (25 mm) for fibers.

The thermoplastic polyamide of the second material of the second layer 18, which material, as mentioned, may be filled or unfilled, particularly may be a polyamide of the type commonly used in CNG and in other fuel delivery or other applications requiring some degree of chemical resistance and/or of electrical conductivity for static dissipation or electrical grounding applications. Such polyamide particularly may be a plasticized or unplasticized nylon such as Nylon 6, 6/66, 6/12, 11, or 12. The specific nylon or other polyamide, or polyolefin, polyester, or other thermoplastic resin may be chosen for reasons of cost and/or for service temperature, chemical compatibility with the fluid being handled, fluid, solvent, moisture, or environmental resistance, flexural modulus, hardness, gas permeation resistance or other physical property, and typically will have a melting point of between about 175-235° C., a thermal decomposition temperature of between about 195-280° C., and a hardness of between about 36 Shore D and 98 Shore A. Polyamide resins of the type herein involved are further described, for example, in U.S. Pat. Nos. 6,506,830; 6,302,153; 5,916,945; 5,643,526; 5,662,975; and in publications US 2003/0124288; 2003/0065107; and 2002/0155242, and are marketed commercially under the tradename "RILSAN®" by ATOFINA Chemicals, Inc., Philadelphia, Pa.

If the polyamide or other thermoplastic resin-based of the material of the second layer is also filled, it may be filled, as mentioned, with a less structured black, i.e., as compared to the black used to fill the PEBA resin-based of the material in the first layer 16. In this regard, the less structured black filler of the second material general may exhibit, as compared to the more structured black of the first material, a relatively smaller BET surface area of not greater than about 200 m$^2$/g, and/or a relatively lower DBP adsorption of not greater than about 250-300 ml/100 g. As admixed with the black, the polyamide or other resin component generally may form a binder within the second material into which the black filler may be dispersed.

Again, the black filler generally may be included within the second material in a proportion sufficient to provide the level of electrical conductivity which is desired for the intended application. For most applications including CNG applications, a bulk or volume resistivity of not greater than about 40 Ω-cm, and/or a surface resistivity of not greater than about 10$^5$ Ω/Sq-cm, generally would be considered acceptable, and would translate to a filler loading which generally may be between about 12-34% by weight, based on the total weight of the second material. In this regard, the surface resistivity of the second layer 18 may be between about 10-250 times higher than that of the first layer 16.

With the layers 16 and 18 each being formed of a mutually-compatible, thermoplastic resin-based material, such layers may be fabricated to form all or a portion of the core tube 14 by extrusion, co-extrusion, or sequential extrusion, and thereby cross-linked or otherwise chemically or fusion bonded together at their interface into an integral, tubular composite structure. By "compatible," it is meant that the PEBA-based material of the first layer 16 and the polyamide-based material of the second layer 18 is each bondable directly to the other to form an integral, composite or laminate structure of core tube 14 such as without the use of an intermediate adhesive, tie, or other layer. Preferably, such bond also is able to be effected without substantial preparation, priming, or other or other surface treatments so as to allow the core tube 14 to be more economically formed for commercial production in a minimum of processing operations by a continuous co-extrusion or other extrusion such as cross-head or sequential extrusion, in addition to molding or co-molding, or other processes such as coating, or a combination of extrusion, molding, and/or coating.

The respective bonds formed therebetween the material of the respective layers 16 and 18 generally will depend upon the respective compositions thereof, but may consist of one or more components which may be chemical in nature, such as by covalent, ionic, or hydrogen, i.e., hydridic bridge, bonding or cross-linking reactions, electrostatic, van der Waals, or other attractive forces, or thermal fusion in nature such as by chain or other intermingling of melt material from the layers. With the application of pressure, such as die, hydrostatic, or mold pressure, followed by cooling to, for example, ambient temperature, an integral, cohesive bond or "weld" may be formed between the layers which generally may have a bond strength, such as a peel strength, of between about 12-65 pounds per linear inch (pli) (21-114 Newtons per linear centimeter (N/cm)). Indeed, it has been observed that in some cases the bond achieved between the materials of the layers 16 and 18 may be such that the tensile strength thereof may exceed the yield strength of the base materials, and in that regard the bond between the layers can be classified as cohesive, i.e., inseparable.

To the extent not directly compatible, one or both of the PEBA and the polyamide or other thermoplastic resin-based materials of the layers 16 and 18 may be blended or otherwise modified, for example, with, typically, between about 5-25% by weight of a functionalized thermoplastic adhesive (TPA) or other resin. By "functionalized," the TPA base resin, which may be an ethylene vinyl acetate (EVA) or other copolymer, or a polyolefin homo- or copolymer, such as polyethylene, polypropylene, or ethylene/acrylate, or a blend of one or more of such polymers and copolymers, may be reacted or admixed with one or more reactive monomers so as to have functional group or sites which may cross-link or otherwise bond chemically with the material or materials of the layers 16 and 18. The TPA base resin typically will be acid-, anhydride-, or acrylate-modified, such as with maleic anhydride. With the layers 16 and 18 again being extruded or otherwise formed, a chemical bond may be formed at the interfaces therebetween, and thereby again form the integral, tubular composite structure of the core tube 14. Representative functionalized TPA materials are marketed under the name Bynel® by DuPont, Wilmington, Del.

As depending upon the requirements of the particular application involved, one or both of the materials forming the layers 16 and 18 further may be compounded with one or more other fillers, and/or with modifiers or other additives. Such additives, which may be functional or inert and which may be the same or different in each of the layers, may be provided to be in liquid, powder, particulate, flake, fiber, or other form, and may include other electrically-conductive fillers, microwave-attenuating fillers, thermally-conductive fillers, lubricants such as molybdenum disulfide ($MoS_2$), wetting agents, surfactants, stabilizers, antioxidants, dispersants, pigments, dyes, and other colorants, colorings, or opacifying agents such as for coloring-coding of the tubing, luminescents, light reflectants, anti-static agents, coupling agents such as titanates, chain extending oils, tackifiers, flow modifiers, blowing agents, foaming or anti-foaming agents, reinforcements such as glass, carbon, or textile fibers, silanes, peroxides, film-reinforcing polymers and other agents, emulsifiers, thickeners, and/or flame retardants and other fillers such as aluminum trihydrate, antimony trioxide, metal oxides and salts, intercalated graphite particles, phosphate esters, decabromodiphenyl oxide, borates, siloxanes, phosphates, halogenated compounds, glass, silica, which may be fumed or crystalline, silicates, mica, ceramics, and glass or polymeric microspheres. Typically, the additives are blended or otherwise admixed with the base material, and may comprise between about 0.05% and 80% or more by total volume of the formulation. An especially preferred modifier for improved heat resistance is polybutylene terephthalate (PBT).

Core tube 14 itself may be used in various tubing such as in the form of the 2-layer construction herein described. In other layer constructions, the tube 14 may be constructed with additional tube layers, which may be extruded or otherwise formed as in the manner described hereinbefore, and/or as having reinforcement layers and/or a surrounding cover or jacket which may be knitted, braided, woven, wound, such as spiral or helically, or wrapped in the case of a fiber, wire, metal foil, tape, film, or the like, or, alternatively, extruded, molded, or coated such as in the case of a resin, on or about, or otherwise as surrounding the tube 14, or as surrounded by the tube 14, or as interposed between the layers 16 and 18 thereof. For example, and as is shown in FIG. 1, a single reinforcement layer, referenced in phantom at 28, may be provided as braided about the outer surface, 29, of the first layer 16 of a nylon, polyester, aramid, or other filament or yarn, and as having a relatively open structure allowing for the first and second layers 16 and 18 to be fusion bonded to each other, with the reinforcement layer 28 being embedded in or encapsulated therebetween.

Similarly, it will be appreciated that in a hose construction, such as of the type described, for example, in U.S. Pat. No. 6,807,988, one or more reinforcement or additional resin layers, or a cover or jacket, may be knitted, braided, woven, wound, or wrapped in the case of a fiber, wire, metal foil, tape, film, or the like, or, alternatively, extruded, molded, or coated such as in the case of an additional resin layer resin layer, on or about, or otherwise as surrounding the outer surface 22 of the core tube 14. Each of the reinforcement layers may be formed of one or more filaments, which may be monofilaments, continuous multi-filament, i.e., yarn, stranded, cord, roving, thread, tape, or ply, or short "staple" strands, of one or more fiber materials. The fiber material, which may be the same or different in each of the reinforcement layers which are provided, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal wire, or a blend thereof. The materials forming the reinforcement, cover, or additional resin layers may be loaded with metals, carbon black, pigments, dyes, reflectants or another fillers in particulate, flake, fiber, or other form so as to render those layers electrically-conductive as well. Separate electrically-conductive or light-reflective fiber or resin layers, wires, and other elements (not shown) also may be incorporated within, in, or on the multi-layer structure of such hose to provide further electrical conductivity and static dissipation, and/or to provide increased visibility.

With respect to the illustrative spiral-wound reinforced hose construction 10 shown in FIGS. 1 and 2, at least two as is shown, and up to eight or more, reinforcement layers, 32a-b, may be provided over the core tube 14. Each of the reinforcement layers 32 may be conventionally formed as braided, knitted, wrapped, or, as is shown, spiral, i.e., helically, wound of, for example, from 1 to about 60 ends of monofilament, continuous multi-filament, i.e., yarn, stranded, cord, roving, thread, tape, or ply, or short "staple" strands of a fiber material. The fiber material, which may be the same or different in layers 32a-b, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal wire, or a blend thereof. In a braided construction (not shown), which also may contain additional spiral wound, wrapped, and/or knitted layers, each of the reinforcement layers may be braided under tension at a pitch angle of between about 45-63° using from between 12-96 carriers each having from 1 to about 32 ends of a 420-6600 denier (470-7400 decitex), multi-filament aramid, polyester, nylon, PVA, or PBO yarn.

In the hose construction 10, which construction also may contain additional braided and/or knitted layers (not shown), the reinforcement layers 32 may be oppositely wound in pairs so as to counterbalance torsional twisting effects. For each of the spiral wound layers 32a-b, from 1 to about 60 parallel ends of, preferably, a 420-6600 denier (470-7400 decitex), multi-filament aramid, polyester, nylon, PVA, or PBO yarn may be helically wound under tension in one direction, i.e., either left or right hand, with the next immediately succeeding layer 30 being wound in the opposite direction. The layers 32a-b may be wound as is shown in FIG. 1 directly over the outer surface 22 of core 14, or, alternatively, over one or more intervening reinforcement layers, as having a predetermined pitched angle, referenced at $\theta$ in FIG. 1 for layer 32a and at $-\theta$ for layer 32b, measured relative to the longitudinal axis 12 of the hose 10. The layers further may be wound with the yarn or other end having a clockwise or counterclockwise twist of between 0 and about 2 turns per centimeter which may be imparted as supplied by the manufacturer, i.e., manufacturer's twist, or as is imparted as the ends are spooled. As is known in the art, the twist may be varied to optimize for example, the flexural fatigue and/or pressure resistance of the hose or to minimize the hose diameter or cost.

For typical applications, the pitch angle $\theta$ will be selected to be between about 40-65°, but particularly may be selected depending upon the desired convergence of strength, elongation, weight, and volumetric expansion characteristics of hose 10. In general, higher pitch angles above about 54.7° exhibit decreased radial expansion of the hose under pressure, but increased axial elongation. For high pressure applications, a "neutral" pitch angle of about 54.7° generally is preferred as minimizing elongation to about ±3% of the original hose length. Each of the layers 30 may be wound at the same or different absolute pitch angle, and it is known that the pitch angles of respective reinforcement layers may be varied to affect the physical properties of the hose. In a preferred construction, however, the pitch angles of reinforcement layers 32a-b are provided to about the same, but as reversed in successive layers.

The tension and area coverage at which the reinforcement layers 32 are braided, wound, or knitted may be varied to achieve the desired flexibility, which may be measured by bend radius, flexural forces, or the like, of the hose 10. For the spiral wound layers 32a-b depicted in FIGS. 1 and 2, the constituent yarns or other ends generally may be applied at or near about 100% coverage such that substantially no space or interstitial area exists between each successive turn, and under a tension of between about 0.12-10.0 ft-lbs (0.53-44.3 N). In the case of a yarn, cord, roving, or other stranded fiber, such fiber may be wound as having a twist, such as a "Z" or "S" twist, of between about 0.15-3.5 turns per inch (0.6-1.38 turns per cm) of length.

To better control the elongation and contraction of hose 10, and for improved impulse fatigue life, the innermost reinforcement layer 32a may be bonded, by means of fusion, mechanical, chemical, or adhesive bonding, or a combination thereof or otherwise, to the outer circumferential outer surface 22 of the core tube 14. Preferably such bond will exhibit a strength of at least about 4 pli (pounds per linear inch) (0.72 kg/linear cm), and may be effected by solvating, tackifying, or plasticizing the core tube outer surface 18 with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane, epoxy, vinyl chloride, vinyl acetate, methyl acrylic, or other adhesive having an affinity to the materials forming tube 14 and layer 32*a*, or otherwise in the manner described, for example, in U.S. Pat. Nos. 3,654,967; 3,682,201; 3,773,089; 3,790,419; 3,861,973; 3,881,975; 3,905,398; 3,914,146; 3,982,982; 3,988,188; 4,007,070; 4,064,913; 4,343,333; 4,898,212; and in Japanese (Kokai) Publ. No. 10-169854 A2 and Canadian Patent No. 973,074.

The outermost reinforcement layer 32*b*, in turn, may be sheathed within one or more layers of a coaxially-surrounding protective cover or jacket, referenced at 40, having a circumferential interior surface, 42, and an opposing circumferential exterior surface, 44. Depending upon its construction, cover 40 may be spray-applied, dip coated, cross-head or co-extruded, or otherwise conventionally extruded, spiral or longitudinally, i.e., "cigarette," wrapped, or braided over the reinforcement layer 32*b* as, for example, a 0.02-0.15 inch (0.5-3.8 mm) thick layer of an abrasion-resistant, preferably melt-processible, thermoplastic material, copolymer, alloy, or blend of a fiber, glass, ceramic, or metal-filled or unfilled polyamide, polyolefin, polyester, polyvinyl chloride, fluoropolymer, thermoplastic rubber (TPR), thermoplastic elastomer (TPE), thermoplastic olefin (TPO), or, most preferably, a thermoplastic polyurethane (TPU) elastomer. By "abrasion-resistant," it is meant that such thermoplastic material for forming cover 40 may have a hardness of between about 60-98 Shore A durometer. Cover 40 alternatively may be formed of a vulcanizable natural or synthetic rubber such as SBR, polybutadiene, EPDM, butyl, neoprene, nitrile, polyisoprene, silicone, fluorosilicone, buna-N, copolymer rubbers, or blends such as ethylene-propylene rubber. Any of these materials forming cover 40 may be loaded with metal particles, carbon black, or another electrically-conductive particulate, flake, or fiber filler so as to render hose 10 electrically-conductive for static dissipation or other applications. Separate electrically-conductive fiber or resin layers (not shown), which may be in the form of spiral or "cigarette-wrapped" tapes or otherwise provided, also may be included in the hose construction 10 between the core 14 and the innermost reinforcement layer 32*a*, between the reinforcement layers 32, or between the outermost reinforcement layer 32*b* and cover 40.

Similar to the bonding of core 14 to the innermost reinforcement layer 32*a*, the interior surface 42 of cover 40 may be bonded to the outermost reinforcement layer 32*b*. Such bond, again, may be by fusion, chemical, mechanical, or adhesive means, or a combination thereof or other means, and preferably will exhibit a strength of at least about 8 pli (1.43 kg/linear cm). As before, the bond may be effected by solvating, tackifying, or plasticizing the surface of the outermost reinforcement layer 32*b* with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane or other adhesive having an affinity to the materials forming reinforcement layer 32*b* and cover 40, or otherwise in the manner described in the above-cited references or in the manner to be described in connection with the bonding between layers 32*a-b*.

In the illustrative multi-layer construction of cover 40 shown in FIGS. 1 and 2, cover 40 is provided as having an innermost cover layer, 46, which is formed of a first, preferably, thermoplastic material and which defines the interior cover surface 42, and a surrounding outermost cover layer, 48, which is formed of a second, preferably, thermoplastic material and which defines the exterior cover surface 44. Depending upon the application, the relative thicknesses of the layers 46 and 48 may be different or about the same. However, to further enhance the flexibility of hose 10, the first thermoplastic material forming the innermost cover layer 46 may be selected has having a flexural modulus which is lower than the flexural modulus of the outermost cover layer 48. In this way, the thickness of the less flexible outermost cover layer 48 may be decreased as compared to a single layer construction of cover 40. Although many combinations of materials may be used, the first thermoplastic material forming the more flexible innermost layer 46 may be a polyamide, polyolefin, polyester, EVA, TPO, TPE, TPU, TPR, fluoroelastomer or other fluoropolymer, polyvinyl chloride, silicone, polyurethane, a natural or synthetic rubber, or a copolymer of blend thereof, with the second material being, independently, a less flexible but harder, i.e., at least about 60 Shore A-durometer, filled or unfilled polyamide, polyurethane, polyester, polyolefin, fluoropolymer, TPE, ionomer resin such as "Surlyn®" (DuPont, Wilmington, Del.), or a copolymer or blend thereof. If formed of chemically compatible thermoplastic materials, the respective layers 44 and 46 may be fusion bonded together at their interface. Alternatively, if formed of chemically incompatible materials, the respective layers 44 and 46 may be bonded together with an adhesive or by means of a surface treatment or tie layer (not shown) interposed therebetween.

Returning to FIGS. 1 and 2, each of the reinforcement layers, such as layer 32*a*, within hose 10 is bonded, typically chemically and also, in most instances, mechanically, to its immediately succeeding layer, such as layer 32*b*, so as to provide for the more efficient transfer of induced internal or external stresses. By "chemically bonded," it is meant that the layers are bonded together, such as by fusion or cross-linking, directly or indirectly through an intermediate adhesive, resin, or other interlayer, as referenced at 60 in FIGS. 1 and 2, such that atoms of the materials forming the reinforcement layers 32*a-b* are bonded to atoms of the other layer 30*a* or 30*b* or to atoms of the material forming interlayer 60. The chemical bond may be either covalent, ionic, or hydridic, i.e., hydrogen, bridge bonding, and results, along with any mechanical bonding, in the formation of an integral reinforcement structure exhibiting, for example, an interlayer bond, i.e., 270° peel strength per ASTM D413-98, "Standard Test Methods for Rubber Property-Adhesion to Flexible Substrates," of at least about 6.0 pli (1.07 kg/linear cm). Further, the radial penetration or other "wetting" of the individual filaments of the fibers forming the reinforcement layers 32 by the applied liquid form of a bonding agent, which may be an adhesive, resin, plasticizer, tackifier, solvent, or the like, may be minimized or otherwise controlled, such as in the manner described in U.S. Pat. No. 6,506,830, such that substantially only the surface filaments or other portion of the filaments of those fibers are contacted by the bonding agent. In this way, the remainder of the filaments are not bound and thereby remain free to elongate or otherwise flex in affording optimum and consistent stress distribution. Typically, the wetted portion of the filaments will be a minor portion of the reinforcement fibers, i.e., between about 0.5-20% by either a total weight, filament number, or volume average, with the major portion being the unwetted balance.

Although, and as mentioned, the inner diameter or bore $D_i$ and overall wall thickness w of core tube 14 typically may vary between about 0.030-0.190 inch (0.076-0.483 cm) for $D_i$ and between about 0.016-0.036 inch (0.040-0.091 cm) for w, it is believed that that an inner diameter or bore $D_i$ of about 3 mm may represent a lower limit. That is, the relationship of the tube inner diameter $D_i$, and the resulting available surface area, vis-à-vis the effective tube wall thickness w, and together with the maximum concentration at which a more structured carbon black filler can be loaded, may effect a practical limitation on how small the hose can be made and still be sufficiently electrically-conductive for the intended application.

In this regard, for bore diameters less than about 3 mm, the resulting electrical resistance increases exponentially. To the extent that the core tube wall thickness and carbon black filler might be increased to reduce the surface and end to end resistance, the hose correspondingly increases in cost and decreases in flexibility. The precepts herein described in connection with the illustrated embodiment thus represent an optimization of hose physical and material properties to achieve reduced hose bore size while maintaining adequate electrical conductivity for safe function, such as when used for flammable, high pressure fuel gas, and while obviating the need and expense of having to employ nano-size blacks in an attempt to maximize the effective electrical charge carrying surface area of the black. It may be therefore that to construct even smaller hoses with improved conductivity would require the use of more expensive and difficult to extrude nano-composite materials.

Thus, illustrative tubing and hose constructions are described for CNG and other fuel conveying applications demanding a balance of certain chemical, physical, and electrical properties.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. An article comprising a tubular polymeric composite member, the composite member comprising a tubular first layer and a tubular second layer concentric with the first layer, wherein:
  the first layer comprises a first material comprising an admixture of a first thermoplastic resin selected from the group consisting of polyether block amides and copolymers and mixtures thereof, and a more structured carbon black particulate filler having one or both of a BET surface area of at least about 500 $m^2/g$, and a DBP pore volume of greater than about 300 ml/100 g; and
  the second layer comprises a second material different from the first material comprising a second thermoplastic resin compatible with the first thermoplastic resin.

2. The article of claim 1 wherein the first and second layer are adjoining.

3. The article of claim 1 wherein the first and second layers are fusion bonded directly together.

4. The article of claim 1 wherein the first material comprises between about 6-25% by weight based on the total weight of the first material of the more structured carbon black particulate filler.

5. The article of claim 1 wherein the first layer has surface resistivity of not greater than about $10^4$ Ω/sq-cm.

6. The article of claim 1 wherein the second material comprises an admixture of the second thermoplastic resin and a less structured carbon black particulate filler.

7. The article of claim 6 wherein the less structured carbon black particulate filler has one or both of a BET surface area of not greater than about 200 $m^2/g$, and a DBP adsorption of not greater than about 300 ml/100 g.

8. The article of claim 7 wherein the less structured carbon black particulate filler has a BET surface area of at least about 500 $m^2/g$.

9. The article of claim 6 wherein the second material comprises between about 12-34% by weight based on the total weight of the second material of the less structured carbon black particulate filler.

10. The article of claim 6 wherein the second layer has surface resistivity of not greater than about $10^5$ Ω/sq-cm.

11. The article of claim 6 wherein each of the first layer and the second layer has a surface resistivity, the surface resistivity of the second layer being between about 10-250 times higher than the surface resistivity of the first layer.

12. The article of claim 1 wherein each of the first layer and the second layer has a thickness, the thickness of the second layer being between about 1.2-4.8 times greater than the thickness of the first layer.

13. The article of claim 1 wherein the second thermoplastic resin is selected from the group consisting of polyamides, polyolefins, and copolymers and mixtures thereof.

14. An article comprising a tubular polymeric composite member, the composite member comprising a tubular first layer and a tubular second layer concentric with the first layer, wherein:
  the first layer comprises a first material comprising an admixture of a first thermoplastic resin selected from the group consisting of polyether block amides and copolymers and mixtures thereof, and a more structured carbon black particulate filler having one or both of a BET surface area of at least about 500 $m^2/g$, and a DBP pore volume of greater than about 300 ml/100 g; and
  the second layer comprises a second material different from the first material comprising a admixture of a second thermoplastic resin compatible with the first thermoplastic resin, and a less structure carbon black having a BET surface area of not greater than about 200 $m^2/g$, and a DBP adsorption of not greater than about 300 ml/100 g.

15. The article of claim 14 wherein the first and second layer are adjoining.

16. The article of claim 14 wherein the first and second layers are fusion bonded directly together.

17. The article of claim 14 wherein:
  the first material comprises between about 6-25% by weight based on the total weight of the first material of the more structured carbon black particulate filler; and
  the second material comprises between about 12-34% by weight based on the total weight of the second material of the less structured carbon black particulate filler.

18. The article of claim 14 wherein:
  the first layer has surface resistivity of not greater than about $10^4$ Ω/sq-cm and
  the second layer has surface resistivity of not greater than about $10^5$ Ω/sq-cm.

19. The article of claim 14 wherein each of the first layer and the second layer has a surface resistivity, the surface resistivity of the second layer being between about 10-250 times higher than the surface resistivity of the first layer.

20. The article of claim 14 wherein each of the first layer and the second layer has a thickness, the thickness of the second layer being between about 1.2-4.8 times greater than the thickness of the first layer.

21. The article of claim 14 wherein the second thermoplastic resin is selected from the group consisting of polyamides, polyolefins, and copolymers and mixtures thereof.

22. An article comprising a tubular polymeric composite member, the composite member comprising a tubular first layer and a tubular second layer concentric with and adjoining the first layer, wherein:
- the first layer comprises a first material comprising an admixture of a first thermoplastic resin selected from the group consisting of polyether block amides and copolymers and mixtures thereof, and a more structured carbon black particulate filler having a BET surface area of at least about 500 m$^2$/g, and a DBP pore volume of greater than about 300 ml/100 g;
- the second layer comprises a second material different from the first material comprising a admixture of a second thermoplastic resin compatible with the first thermoplastic resin, and a less structure carbon black having a BET surface area of not greater than about 200 m$^2$/g, and a DBP adsorption of not greater than about 300 ml/100 g; and
- the first and second layers are fusion bonded directly together.

23. The article of claim 22 wherein:
- the first material comprises between about 6-25% by weight based on the total weight of the first material of the more structured carbon black particulate filler; and
- the second material comprises between about 12-34% by weight based on the total weight of the second material of the less structured carbon black particulate filler.

24. The article of claim 22 wherein:
- the first layer has surface resistivity of not greater than about 10$^4$ Ω/sq-cm; and
- the second layer has surface resistivity of not greater than about 10$^5$ Ω/sq-cm.

25. The article of claim 22 wherein each of the first layer and the second layer has a surface resistivity, the surface resistivity of the second layer being between about 10-250 times higher than the surface resistivity of the first layer.

26. The article of claim 22 wherein each of the first layer and the second layer has a thickness, the thickness of the second layer being between about 1.2-4.8 times greater than the thickness of the first layer.

27. The article of claim 22 wherein the second thermoplastic resin is selected from the group consisting of polyamides, polyolefins, and copolymers and mixtures thereof.

* * * * *